United States Patent
Banerjee et al.

(10) Patent No.: US 7,382,733 B2
(45) Date of Patent: Jun. 3, 2008

(54) METHOD FOR HANDLING REORDERED DATA PACKETS

(75) Inventors: Dwip N. Banerjee, Austin, TX (US);
Radhika Chirra, Austin, TX (US);
Ketan P. Pancholi, Austin, TX (US);
Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 820 days.

(21) Appl. No.: 10/777,723

(22) Filed: Feb. 12, 2004

(65) Prior Publication Data
US 2005/0180327 A1 Aug. 18, 2005

(51) Int. Cl.
*H04L 12/16* (2006.01)
(52) U.S. Cl. .......................... 370/236; 714/16; 714/18
(58) Field of Classification Search ............... 370/389, 370/394, 395.52, 412–418, 428–429, 470–474, 370/230–236; 709/223–224, 230–236
See application file for complete search history.

(56) References Cited

U.S. PATENT DOCUMENTS

| 6,493,316 B1 * | 12/2002 | Chapman et al. | ........... 370/231 |
|---|---|---|---|
| 7,058,085 B2 * | 6/2006 | Earnshaw et al. | .......... 370/473 |
| 7,061,913 B1 * | 6/2006 | Abrol et al. | ................ 370/394 |
| 7,239,610 B2 * | 7/2007 | Su et al. | ..................... 370/230 |
| 2004/0095964 A1 * | 5/2004 | Meylan et al. | .............. 370/506 |

OTHER PUBLICATIONS

Floyd, Sally; *A Survey of Recent Developments of TCP*, IEEE Annual Computer Communications Workshop, Oct. 17, 2001, 18 pages.
Floyd, S., et al.; *An Extension to the Selective Acknowledgement (SACK) Option for TCP*, Request for Comments 2883, Jul. 2000, 16 pages.
M. Allman; *TCP Congestion Control*, Request for Comments 2581, Apr. 1999, 13 pages.

* cited by examiner

*Primary Examiner*—Chi H. Pham
*Assistant Examiner*—Thai D Hoang
(74) *Attorney, Agent, or Firm*—Williams Morgan & Amerson, LLP (57) ABSTRACT

The present invention provides a method for handling reordered data packets. A method comprises receiving a data packet and determining if the data packet is received out of order. The method further comprises delaying transmission of an acknowledgement indicating that a data packet is missing in response to determining that the data packet is received out of order.

6 Claims, 6 Drawing Sheets

METHOD FOR HANDLING REORDERED DATA PACKETS

BACKGROUND OF THE INVENTION

1. Field of the Invention

The invention generally relates to network communications, and, in particular, to handling data packets that are reordered in a network.

2. Description of the Related Art

The design of error and congestion control mechanisms in Transmission Control Protocol (TCP) is generally based on the premise that packet loss is an indication of network congestion. Upon detecting loss of data packet(s), a TCP sender backs off its transmission rate by decreasing its congestion window. TCP uses two strategies for detecting packet loss. The first one is based on the sender's retransmission time-out (RTO) expiring and is sometimes referred to as "coarse time-out." When the sender times out, congestion control responds by causing the sender to enter slow-start, thereby drastically decreasing its congestion window to one segment. The other loss detection mechanism originates at the receiver and uses TCP's sequence number. Essentially, the receiver observes the sequence numbers of packets it receives, and a "hole" in the sequence is considered indicative of a packet loss. The receiver generates a "duplicate acknowledgment" (or DUPACK) for every "out-of-order" packet it receives. Until the missing packet is received, each received data packet with a higher sequence number is considered to be "out-of-order," and will cause a DUPACK to be generated. The transmission of DUPACK(s) is described in Request for Comments (RFC) 2581, entitled "TCP Congestion Control," dated April, 1999.

Packet reordering is generally attributed to transient conditions, pathological behavior, and erroneous implementations. For example, oscillations or "route flaps" among routes with different round-trip times (RTTs) are a common cause of out-of-order packets. Another cause of packet reordering can be network routers that provide parallel paths for data packets associated with a same connection. That is, for performance reasons, network routers may transmit incoming data packets over parallel (or alternative) paths to a destination, even though the data packets are associated with the same connection. Thus, the data packets can arrive at their intended destination out of order. One example of a router that can cause packet reordering is Etherchannel® provided by Cisco®.

To improve network performance in the event packet reordering occurs, some TCP implementations have adopted a "fast retransmit" algorithm that infers that a packet has been lost after the sender receives a few DUPACKs. The sender then retransmits the lost packet without waiting for a time-out and reduces its congestion window in half. The "fast retransmit" algorithm is generally intended to improve TCP's throughput by avoiding the sender to time-out (which results in slow-start and consequently the shutting down of the congestion window to one).

Fast retransmit can improve TCP's performance in the presence of sporadic reordering. However, it still operates under the assumption that out-of-order packets indicate packet loss, and therefore congestion, even though no actual loss may have occurred. Consequently, the network performance degrades considerably in the presence of persistent reordering because the repeated false fast retransmits can keep the sender's congestion window relatively small.

The present invention is directed to addressing, or at least reducing, the effects of, one or more of the problems set forth above.

SUMMARY OF THE INVENTION

In one aspect of the instant invention, a method is provided for handling reordered data packets. A method comprises receiving a data packet and determining if the data packet is received out of order. The method further comprises delaying transmission of an acknowledgement indicating that a data packet is missing in response to determining that the data packet is received out of order.

In another aspect of the instant invention, an apparatus is provided for handling reordered data packets. An apparatus comprises an interface communicatively coupled to a control unit. The control unit is adapted to determine an occurrence of packet reordering and receive a first data packet over the interface. The control unit is further adapted to determine that a data packet is missing based at least on the received first data packet and delay transmission of a missing data packet indication in response to determining that packet reordering has occurred and in response to determining that the second data packet is missing.

In yet another aspect of the instant invention, an article comprising one or more machine-readable storage media containing instructions is provided for handling reordered data packets. The instructions, when executed, enable a processor to receive a first data packet and determine that a second data packet is missing based on the received first data packet. The instructions, when executed, further enable a processor to delay transmission of a missing data packet indication in response to determining that the second data packet is missing.

BRIEF DESCRIPTION OF THE DRAWINGS

The invention may be understood by reference to the following description taken in conjunction with the accompanying drawings, in which like reference numerals identify like elements.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
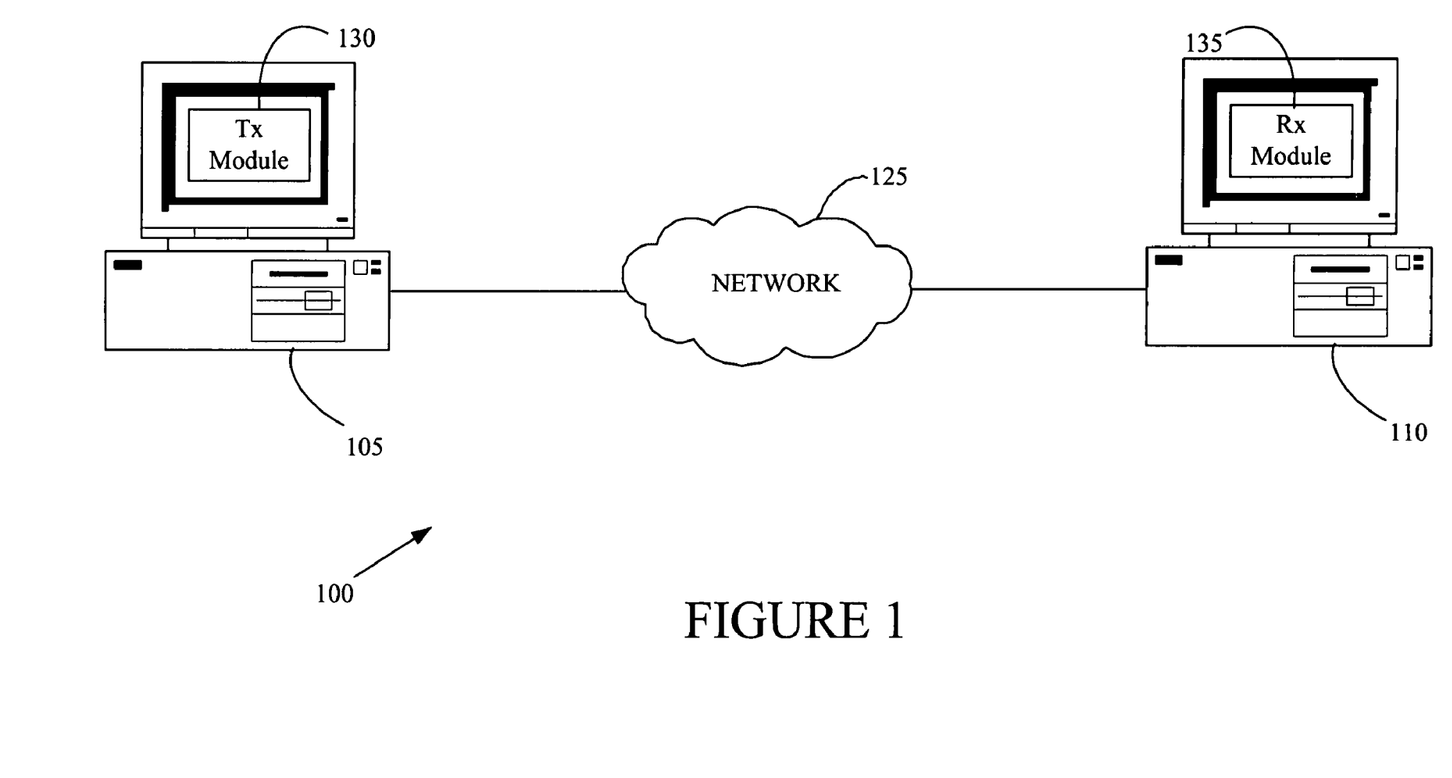
FIG. 1 is a block diagram of an embodiment of a communications system including a receiving module capable of processing reordered packets in accordance with the present invention.

Referring to FIG. 1, a communications system 100 is illustrated in accordance with one embodiment of the present invention. The communications system 100 includes a first processor-based device 105 that is communicatively coupled to a second processor-based device 110 by a network 125, such as by a private network or a public network (e.g., the Internet). In the illustrated embodiment, the first device 105 includes a transmit module 130 (Tx module) for transmitting data packets, and the second device 110 includes a receiving module 135 (Rx module) for receiving the transmitted data packets. For illustrative purposes, the devices 105, 110 are depicted in FIG. 1 to include the respective transmitting module 130 and receiving module 135, although it should be appreciated that in an alternative embodiment, the devices 105, 110 may each include both modules 130, 135, and thus may be capable of transmitting and receiving data packets at desired times.

In some instances, the data packets transmitted by the device 105 over the network 125 may arrive out of order at the device 110. As noted, packet reordering in the network 125 can be caused by transient conditions, pathological behavior, and erroneous implementations. As is described in greater detail, in accordance with one embodiment of the present invention, the receiving module 135 improves the performance of the network 125 in which data packets may arrive at the device 110 out of order. In one embodiment, and as explained below, this may be accomplished without requiring modifications to the transmission side (i.e., the transmitting module 130).

The network 125 of FIG. 1 may be a packet-switched data network, such as a data network according to the Internet Protocol/Transport Control Protocol (TCP/IP). Examples of the network 125 may include local area networks (LANs), wide area networks (WANs), intranets, and the Internet. One version of IP is described in Request for Comments (RFC) 791, entitled "Internet Protocol," dated September 1981, and a version of TCP is described in RFC 793, entitled "Transmission Control Protocol," dated September 1981. Other versions of IP, such as IPv6, or other connectionless, packet-switched standards may also be utilized in further embodiments. A version of IPv6 is described in RFC 2460, entitled "Internet Protocol, Version 6 (IPv6) Specification," dated December 1998. The data network 125 may also include other types of packet-based data networks in further embodiments. Examples of such other packet-based data networks include Asynchronous Transfer Mode (ATM), Frame Relay networks and the like.

Figure 2:
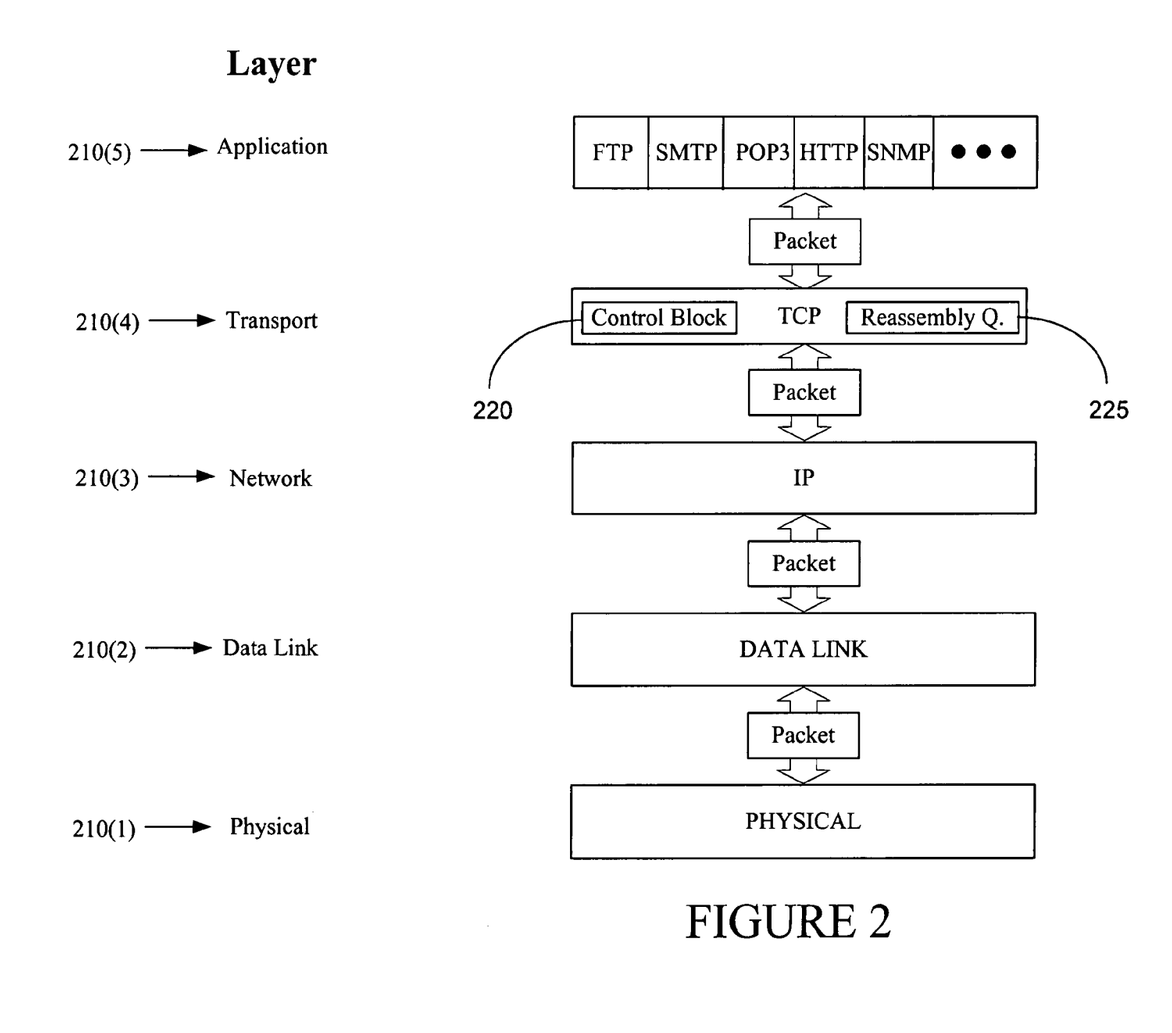
FIG. 2 illustrates a stylistic view of a suite of protocols that may be employed in the communications system of FIG. 1, in accordance with one embodiment of the present invention.

For illustrative purposes, the devices 105, 110 communicate using TCP/IP, although the present invention is not limited as such, and that, in alternative embodiments, other suitable protocols may also be employed. TCP/IP includes a suite of protocols, some of which are shown in FIG. 2. FIG. 2 depicts one embodiment of a network architecture, illustrated in various layers 210(1-5), where some of the layers 210(1-5) include various protocols associated with TCP/IP. Each layer 210 serves a desired purpose, as generally discussed below.

In the illustration of FIG. 2, the first layer 210(1) includes the physical layer, and the second layer 210(2) includes the data link layer. The physical layer and the data link layer are typically not considered part of the TCP/IP suite protocols. The data link layer generally manages the data that is communicated over the network 125, and the physical layer generally transforms data into bits that are communicated over the network 125. Examples of protocols employed in the physical layer may include, but are not limited to, protocols for the network interface card, such as an Ethernet card, token ring card, wireless network card, and the like. The Institute of Electrical and Electronics Engineers (IEEE) has promulgated a variety of protocols that may be employed in the physical layer, protocols such as IEEE 802.3 standard (Ethernet), IEEE 802.5 standard (Token Ring), and IEEE 802.11 standard (wireless Ethernet). The data link may include Media Access Control (MAC) protocols. In alternative embodiments, protocols other than those identified above may also be employed in the physical layer and/or data link layer without deviating form the spirit and scope of the present invention.

The IP/TCP suite of protocols in the illustrated embodiment resides in the next three layers 210(3-5) of FIG. 2. The third layer 210(3) includes the Internet Protocol (IP), which is generally responsible for the network connectivity, including addressing. The fourth layer 210(4) includes the transport layer protocol, an example of which is the Transmission Control Protocol (TCP). TCP utilizes IP to deliver packets to upper-layer applications and is capable of providing a reliable stream of data among computers on the network 125. TCP may perform error checking (to confirm that the data packets arrive uncorrupted), sequence numbering (to place the packets back into the right order), and the like. The transport layer 210(4), in the illustrated embodiment, includes a TCP control block 220 where, among other things, TCP implementation-specific information can be stored, and a reassembly queue 225 where out of order data packets can be temporarily stored before they are re-arranged. Although not shown, the fourth layer 210(4) may also include the User Datagram Protocol (UDP).

In FIG. 2, the fifth layer 210(5) includes the application layer protocols, applications, and services that provide a user interface to the other TCP/P layers. Examples of the application layer protocols include File Transfer Protocol (FTP), Simple Mail Transfer Protocol (SMTP), Post Office Protocol, v3 (POP3), Hyper Text Transfer Protocol (HTTP), Simple Network Management Protocol (SNMP), and the like. An example of services that may be provided as part of the fifth layer 210(5) include Domain Name Service (DNS), and an example of an application that may be part of the fifth layer 210(5) is telnet, which allows a user to connect to a remote device.

Referring again to FIG. 1, the devices 105, 110 may utilize at least a portion of the TCP/IP suite of protocols shown in FIG. 2 to transmit and/or receive data packets. The devices 105, 110 may be any variety of processor-based systems that are capable of communicating with each other, and may include, but are not limited to, computers, portable electronic devices, Internet appliances, and the like. Although not shown, the devices 105, 110 may be coupled to the network 125 through a router (not shown), gateway (not shown), or by other intervening, suitable devices.

As utilized herein, a "network" may refer to one or more communications networks, channels, links, or paths, and systems or devices (such as routers) used to route data over such networks, channels, links, or paths.

The various modules 130, 135 illustrated in FIG. 1 are implemented in software, although in other implementations these modules may also be implemented in hardware or a combination of hardware and software. It should be appreciated that while a single receiving module 135 is depicted in FIG. 1, that in alternative embodiments, the receiving module 135 may include a plurality of modules, with each module capable of providing one or more of the desired operations. For example, the module 135 may include a module for transmitting acknowledgements, a module for reassembling data packets received out of order, and the like. The receiving module 135, in one embodiment, may be implemented within the transport network layer 210(4) of FIG. 2 (e.g., as part of the Transmission Control Protocol).

It should be understood that the configuration of the communications system 100 of FIG. 1 is exemplary in nature, and that fewer, additional, or different components may be employed in other embodiments of the communications system 100. For example, in one embodiment, although not shown in FIG. 1, the systems 105 and 110 may include a HTTP service routine that is capable of receiving HTTP requests over the network 125, as well as sending HTTP responses over the network 125. One version of HTTP is described in RFC 2068, entitled "Hypertext Transfer Protocol—HTTP/1.1," dated January 1997. While the communications system 100 in the illustrated example includes two processor-based devices 105, 110, in other embodiments, the number of devices employed may be more or fewer. Similarly, other configurations may be made to the communications system 100 without deviating from the spirit and scope of the invention.

Figure 3:
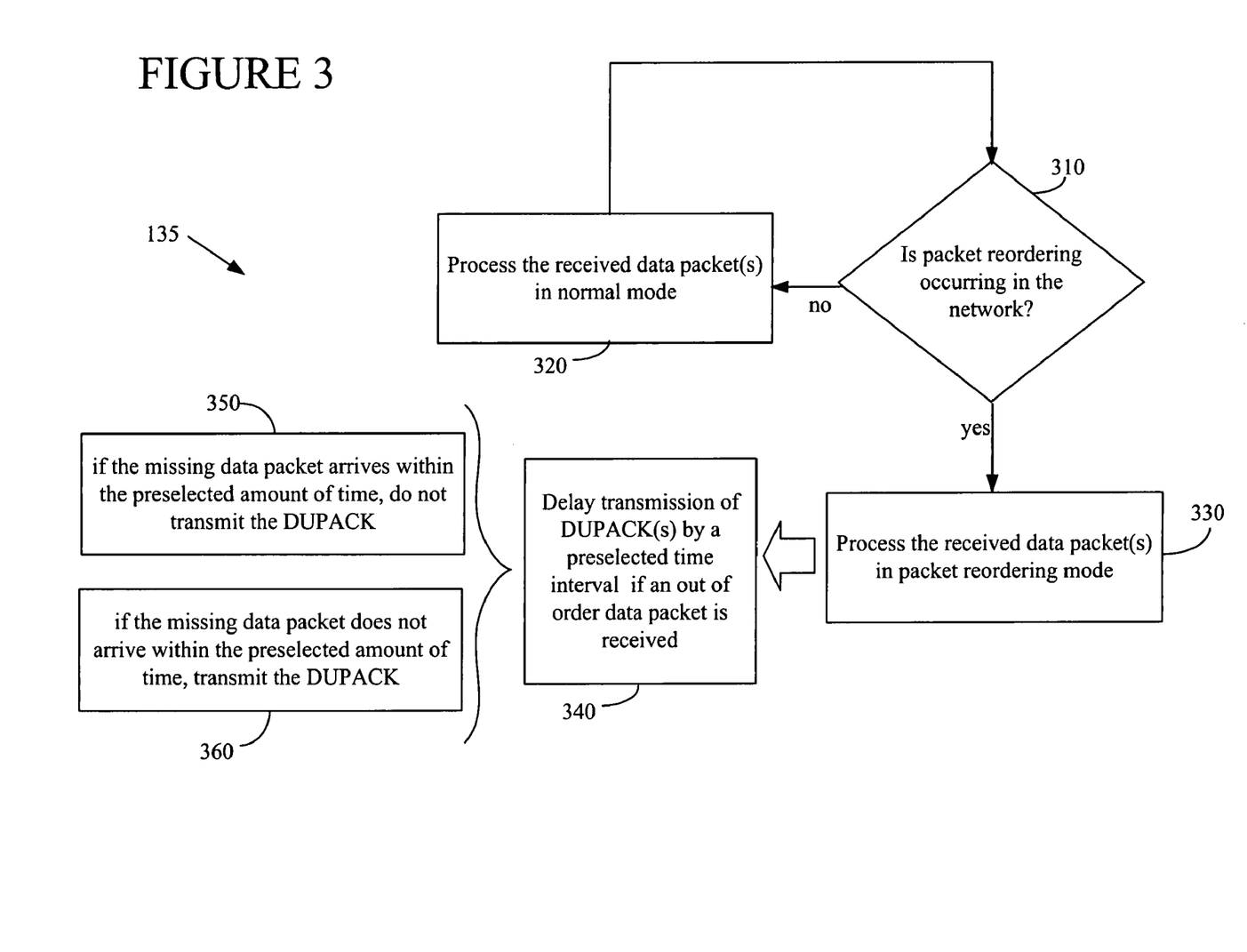
FIG. 3 illustrates a flow diagram of one aspect of the receiving module of FIG. 1 that may be implemented in the communications system of FIG. 1, in accordance with one embodiment of the present invention.

FIG. 3 depicts a flow diagram illustrating at least one operation performed by the receiving module 135 of FIG. 1 for handling reordered data packets. For ease of illustration, the flow diagram of FIG. 3 is described in the context of FIG. 1, where the second processor-based device 110 receives data packets transmitted by the first processor-based device 105. As noted earlier, in the illustrated embodiment, the devices 105, 110 of FIG. 1 use Transmission Control Protocol (TCP) as a transport level protocol to communicate.

When a new connection is established between two devices 105, 110 using TCP, a synch (SYN) segment, as well as an initial sequence number, is transmitted by the sending device 105 to the receiving device 110. The sequence number, which is chosen by the sending device 105 and is stored in a header field of each of the transmitted data packets, identifies the order of the transmitted packets relative to each other for a given connection. Because of transient conditions, pathological behavior, erroneous implementations, or other reasons, one or more of the data packets transmitted by device 105 may, in some instances, arrive at the receiving device 110 out of order (or out of sequence). As mentioned above, conventional TCP employ a "fast retransmit" mechanism that can generally improve TCP's performance in the presence of sporadic reordering. However, this mechanism still operates under the assumption that out-of-order packets indicate packet loss, and therefore congestion, even though no actual loss may have occurred. Consequently, the network performance degrades considerably in the presence of persistent reordering because the repeated false fast retransmits keep the sender's congestion window relatively small. As described below, the receiving module 135 is capable of improving the performance of the network 125 in the event packet reordering occurs in the network 125.

The receiving module 135 of FIG. 3 is capable of operating in a "normal" mode or in a "packet reordering" mode, depending on whether the receiving module 135 detects (at 310) packet reordering (i.e., detects if data packets that are transmitted by the sending device 105 are being received out of order (or sequence) at the second device 110). If packet reordering is not detected (at 310), the receiving module 135 operates (at 320) in the "normal mode" much in the same manner as conventional TCP receivers handle data packets. If, however, packet reordering is detected (at 310), the receiving module 135 operates (at 330) in the "packet reordering" mode in which the receiving module 135 delays (at 340) transmission of duplicate ACK(s) (or DUPACK(s)) to the sending device 105 by a preselected time interval the next time an out of order data packet is detected. This is in contrast to a conventional TCP receiver that, upon detecting an "out-of-order" received packet, promptly generates and transmits a DUPACK to a conventional TCP transmitter, which, in turn, reduces its congestion window by half. By delaying the transmission of DUPACKs, the receiving module 135 of the instant invention has an opportunity to sequence (or reassemble) the data packets arriving out of order over a longer time interval, thereby reducing the number of DUPACKs that need to be transmitted to the device 105. Moreover, because fewer DUPACKs are transmitted to the sending device 105, the congestion window (on the sender side) may not need to be reduced as often or as much as it would otherwise be in a conventional TCP transmitter, thereby resulting in improved network throughput.

As noted, in the "packet reordering" mode, the receiving module 135 delays (at 340) the transmission of DUPACK(s) to the sending device 105 by a preselected amount of time. If the missing data packet arrives within the preselected amount of time, the receiving module 135 does not transmit (at 350) any DUPACK(s) for the received out-of-order packets. Thus, by reducing the need to transmit unnecessary DUPACK(s), and thereby avoiding unnecessarily reducing the congestion window of the transmitting module 130, the receiving module 135 is able to improve network performance. If, on the other hand, the missing data packet does not arrive within the preselected amount of time (thus suggesting a lost packet rather than a reordered packet), the receiving module 135 transmits (at 360) a DUPACK(s) for one or more of the data packets that are received out-of-order.

Figure 4A:
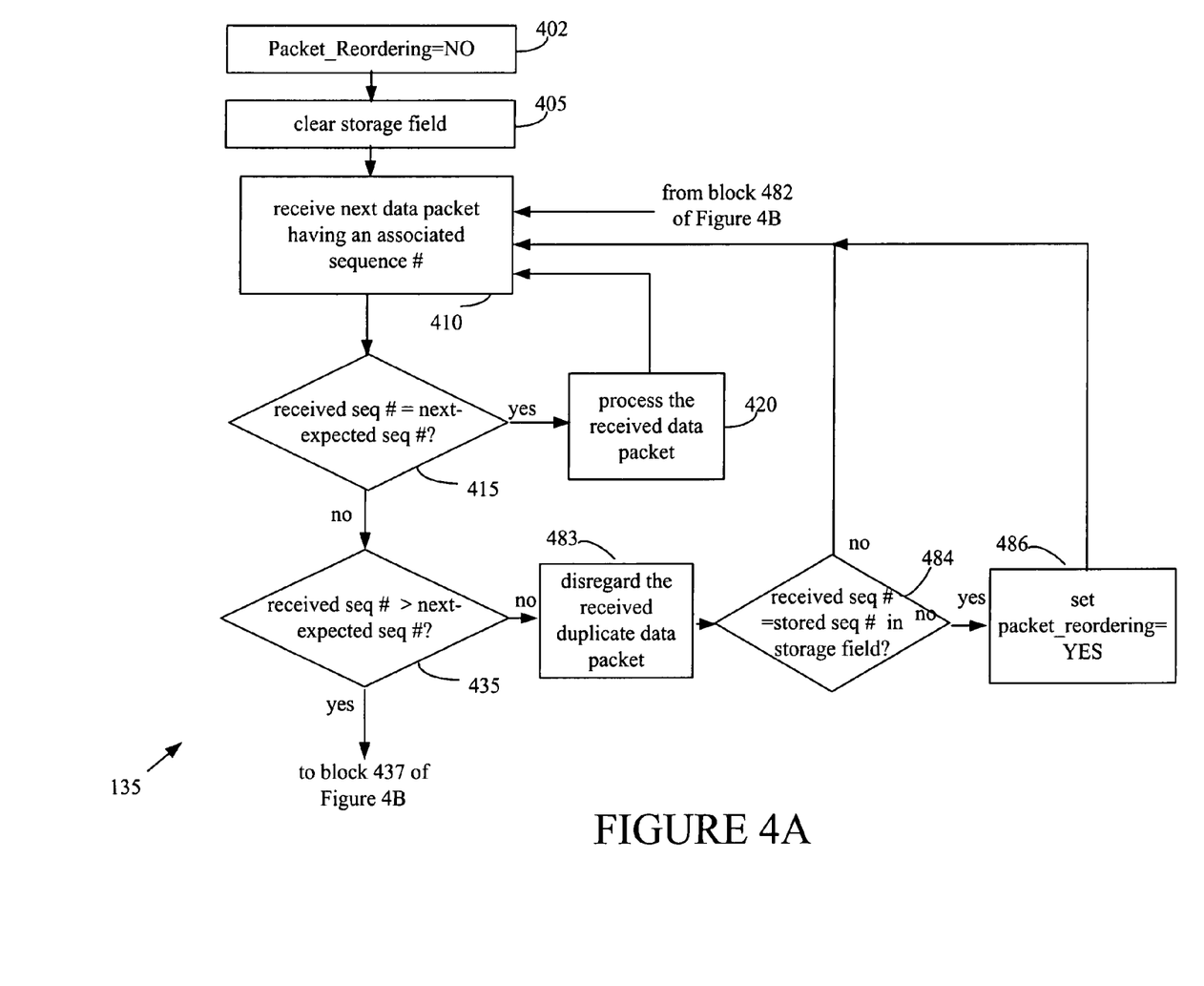
FIGS. 4A-4B depict a flow diagram of one aspect of the receiving module of FIG. 1 that may be implemented in the communications system of FIG. 1, in accordance with one embodiment of the present invention.
Figure 4B:
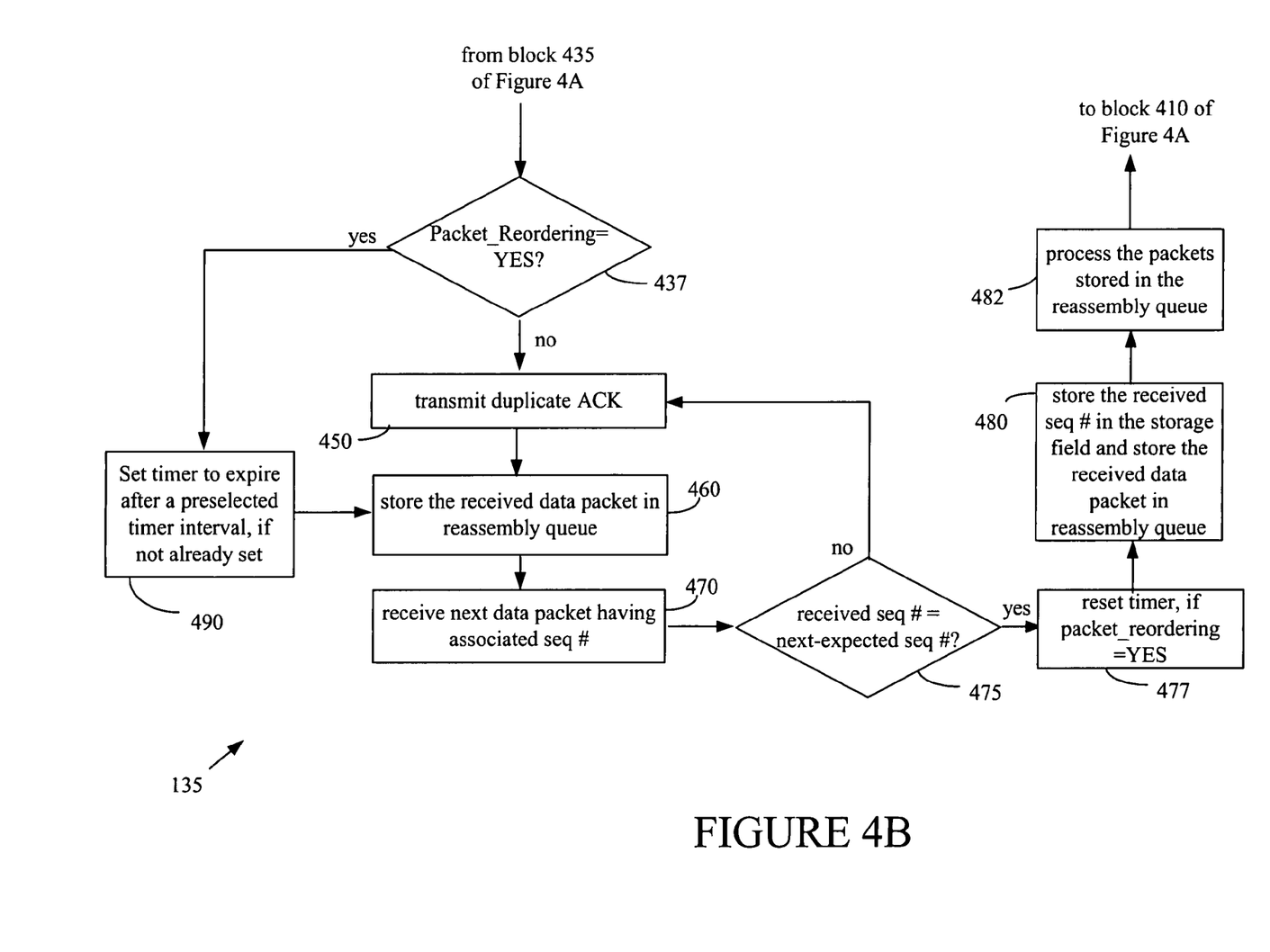

FIGS. 4A-4B illustrate an embodiment of a flow diagram of one aspect of the receiving module 135 that is capable of operating in either the "normal" mode or "packet reordering" mode. For ease of illustration, the flow diagram of FIGS. 4A-4B are discussed in the context of a specific example. For illustrative purposes, it is herein assumed that the next ten data packets that are received by the device 110 are in the sequence shown in Table 1 below.

TABLE 1

| The Next Ten (10) Arriving Packets | The Next Expected Packet | Actually Received Packet (w/SEQ # and length of the data packet) |
|---|---|---|
| packet 1 | packet with seq 2500 | seq 2500 len 500 |
| packet 2 | packet with seq 3000 | seq 3500 len 200 |
| packet 3 | packet with seq 3000 | seq 3700 len 100 |
| packet 4 | packet with seq 3000 | seq 3800 len 200 |
| packet 5 | packet with seq 3000 | seq 3000 len 500 |
| packet 6 | packet with seq 4000 | seq 4000 len 500 |
| packet 7 | packet with seq 4500 | seq 3000 len 500 (duplicate) |
| packet 8 | packet with seq 4500 | seq 5000 len 500 |
| packet 9 | packet with seq 4500 | seq 5500 len 500 |
| packet 10 | packet with seq 4500 | seq 4500 len 500 |

In the above example, it is assumed that the next data packet that the receiving module 135 expects to receive is packet 2500. If no packet reordering were to occur in the network 125, the above packets would arrive at the device 110 in the proper sequence, starting from packet 2500 and ending with 5500. However, as can be seen in the above sequence, various data packets arrive at out-of-order (e.g., packet 3000 arrives after packet 3800 instead of after packet 2500 and packet 4500 arrives after packets 5000 and 5500 instead of packet 4000). Moreover, in the above example, it is noted that packet 7 is a duplicate of packet 5.

Referring to FIGS. 4A and 4B, the receiving module 135 initializes (at 402) a "packet_reordering" variable to a default "NO" value, which indicates that initially no packet reordering has been detected. In the illustrated embodiment, the receiving module 135 operates in the "normal" mode while the "packet_reordering" is "NO," and operates in the "packet reordering" mode while it is "YES." It is noted that in one embodiment a "0" and "1" may be utilized to represent a "NO" and "YES."

In FIGS. 4A-B, the receiving module 135 clears (at 405) the contents of a storage field, such as a register, in which a sequence number of a data packet may be stored. In the illustrated embodiment, and as is discussed below, this storage field is utilized for storing a copy of a received out-of-order data packet that triggers a reassembly event. In one embodiment, the storage field may be a storage space that is defined within the TCP's control block 220 (see FIG. 2).

Because the transport protocol employed for communications in the illustrated embodiment is TCP, each data packet transmitted by the sending device 105 has an associated sequence number. Additionally, in accordance with TCP, as data packets are transmitted by the sending device 105, the receiving module 135 of the device 110 internally tracks the next data packet that it expects to receive from the sending device 105. For the purposes of this description, the sequence number for the next expected packet data is hereinafter referred to as "next-expected sequence number" and the sequence number of the actually received packet data is hereinafter referred to as "received sequence number." In the context of the example of Table 1, as previously noted, the receiving module 135 initially expects to receive a data packet with a sequence number of 2500. Thus, in this example, the next-expected data sequence number initially is 2500.

Referring again to FIGS. 4A-4B, the receiving module 135 receives (at 410) a data packet transmitted by the sending device 105. In the context of the exemplary sequence shown in Table 1, the data packet that is received (at 410) by the receiving module 135 is packet 2500. The receiving module 135 determines (at 415) if the sequence number of the data packet received (at 410) (i.e., received sequence number) is equal to the next-expected sequence number. In the context of the example of Table 1, and in particular as can be seen with reference to packet 1, the sequence number of the next-expected data packet (i.e., packet 2500) matches the sequence number of the received data packet. If the sequence number of the received data packet matches the sequence number of the next expected data packet, it is an indication that data packets are being received in sequence. As such, the receiving module 135 processes (at 420) the received data packet.

Processing (at 420) the received data packet (e.g., packet 2500) may include providing the data packet to the appropriate application (e.g., HTTP, FTP, etc.) in the application layer 210(5) (see FIG. 2), transmitting an acknowledgement to the sending device 105 indicating that the data packet was received successfully, and the like. In TCP, the acknowledgement that is sent to the sending device 105 typically contains the next sequence number that the receiving device 110 expects to receive. Of course, in other protocol implementations, the acknowledgement may include the sequence number of the last data packet to have been successfully received (as opposed to the sequence number of the data packet that is expected next).

The receiving module 135 receives (at 410) a next data packet. The above-described procedure may be repeated for the data packets that arrive in sequence (or not out-of-order). In Table 1, the next data packet to arrive is packet 3500 (packet 2), even though the next expected data packet by the receiving module 135 is 3000. Thus, in this example, when data packet 3500 is received (at 410), the receiving module 135 determines (at 415) that the received sequence number is not equal to the next-expected sequence number. Accordingly, the receiving module 135 determines (at 435) if the received sequence number (e.g., packet 3500) is greater than the next-expected sequence number (e.g., packet 3000). If the sequence number of the received data packet is greater than the sequence number of the next expected data packet, then that is an indication that the data packet expected next by the receiving device 110 is missing because it has been lost or it has been reordered and thus may arrive at a later time. In the instant example, the sequence number of the arrived data packet (e.g., packet 3500) is greater than the next-expected data packet (i.e., packet 3000). As such, data packet 3000 may be lost or may arrive out-of-order.

If it is determined (at 435) that the received sequence number is greater than the next-expected sequence number, as is the case in the example of Table 1, the receiving module 135 determines (at 437) if the variable "packet reordering" is set to YES (i.e., an indication that packet reordering has been detected, and that the mode of operation should be the "packet reordering" mode). In the instant case, because the "packet reordering" variable was initialized to NO (at 402), in this case, the receiving module 135 transmits (at 450) a duplicate ACK (DUPACK) to the sending device 105. In the context of the example in Table 1, the receiving module 135 transmits (at 450) a DUPACK upon receiving data packet 3500 (because it was received out-of-order). In one embodiment, the receiving module 135 transmits a DUPACK for each out-of-order data packet received in the process of determining whether packet reordering is occurring in the network 125. As described later, once it is determined that packet reordering is occurring (i.e., the "packet_reordering" variable is set to YES), the receiving module 135, in one embodiment, delays the transmission of DUPACK(s) to allow additional time for the missing data packet to arrive in the event it has been delayed during transit.

The received data packet (e.g., packet 3500) is stored (at 460) in the reassembly queue 225 (see FIG. 2), which may be a storage location where data packets may be temporarily stored and later arranged in order. The receiving module 135 receives (at 470) a next data packet, where the associated sequence number of this received data packet is compared (at 475) to the next-expected sequence number. If the two sequence numbers are not equal, then that is an indication that the data packet expected next has not yet been received. The above-described process may be repeated for each out-of-order data packet that is received. In the context of the exemplary sequence of Table 1, the receiving module 135 receives (at 470) the data packet 3700 (packet 3), and compares (at 475) the sequence number of this received packet to the next-expected sequence number (which is seq 3000 in the example). Because the two sequence numbers do not match, the receiving module 135 transmits (at 450) a duplicate ACK (DUPACK) to the sending device 105. The data packet 3700 is then stored (at 460) in the reassembly queue 225.

The receiving module 135 receives (at 470) a next data packet, where the associated sequence number of this received data packet is compared (at 475) to the next-expected sequence number. In the context of the exemplary sequence of Table 1, the receiving module 135 receives (at 470) the data packet 3800 (packet 4), and compares (at 475) the sequence number of this received packet to the next-expected sequence number (which is seq 3000). Because the two sequence numbers do not match, the receiving module 135 transmits (at 450) a duplicate ACK (DUPACK) to the sending device 105. Thus, by now, the receiving module 135 has transmitted (at 450) three DUPACK(s) to the sending device 105, one for each of the out-of-order data packet (e.g., packet 3500, 3700, and 3800) that is received. The transmission of these DUPACK(s) results in a retransmission of the missing data packet 3000 by the sending device. The receiving module stores (at 460) the data packet 3700 in the reassembly queue 225.

The receiving module 135 receives (at 470) a next data packet, where the associated sequence number of this received data packet is compared (at 475) to the next-expected sequence number. In the context of the exemplary sequence of Table 1, the receiving module 135 receives (at 470) packet 5, which is data packet 3000 that was previously missing, and compares (at 475) the sequence number of this received packet to the next-expected sequence number. As can be seen in Table 1 with respect to packet 3, the received data packet sequence number is equal to the next-expected sequence number.

If it is determined (at 475) that the received data packet is the next expected data packet, an indication that the missing data packet has been received, the receiving module 135 resets (at 477) a timer (discussed later) if the variable "packet reordering" is set to YES. Because this variable is initially set to NO, the timer is not reset (at 477). The step of block 477 is discussed in greater detail below. The receiving module 135 stores (at 480) the sequence number of the received data packet (e.g., seq 3000) in the storage field (e.g., in the control block 220 of TCP) and also stores (at 480) the received data packet (e.g., data packet 3000) in the reassembly queue 225. The value stored in the storage field in the illustrated embodiment now contains a sequence number (e.g., seq 3000) of a missing data packet that triggered a reassembly event.

The receiving module 135 processes (at 482) the data packets stored in the reassembly queue 225. The act of processing (at 482) may include organizing the packets sequentially, providing the sequentially organized packets to the appropriate application (e.g., HTTP, FTP, etc.) in the application layer 210(5) (see FIG. 2), and/or transmitting a cumulative acknowledgement to the sending device 105 upon receiving the missing data packet. Thus, in the context of the example of Table 1, the receiving module 135 may transmit a cumulative acknowledgment for the received data packets 3000, 3500, 3700, and 3800. The sequence number of the next-expected packet in the illustrated embodiment at this point is seq 4000.

Upon processing (at 482) the data packets stored in the reassembly queue 225, the receiving module 135 may receive (at 410) a next data packet and repeat the one or more of the above-described acts. In the exemplary sequence of Table 1, the next data packet received is data packet 4000 (i.e., packet 6). The receiving module 135 determines (at 415) if the received sequence number is equal to the next-expected sequence number, and, as shown in Table 1, the next-expected sequence number is 4000. Thus, the receiving module 135 processes (at 420) this received packet (packet 4000), and receives (at 410) a next data packet, which, as shown in Table 1 (see packet 7), is data packet 3000 (even though the next expected packet should be packet 4500).

In the exemplary sequence of Table 1, data packet 3000 is the seventh packet received by receiving module 135. Data packet 3000 is a duplicate copy of the third data packet that was received earlier by the receiving module 135. This duplicate copy may be a result of a retransmission by the sending device 105 in response to the DUPACKs that were transmitted (at 450) by the device 110.

The receiving module 135 determines (at 415) if the sequence number of the received data packet (e.g., packet 3000) is equal to the next-expected sequence number (e.g., seq 4500). Next, the receiving module 135 determines (at 435) if the sequence number of the received data packet (e.g., packet 3000) is greater than the next-expected sequence number (e.g., seq 4500). Because the next-expected sequence number represents the data packet that the receiving module 135 expects to receive next, any lower sequence numbers received indicates the received data packet is a "duplicate" copy of a data packet that has been previously received successfully. As such, the duplicate copy (e.g., packet 3000) may be disregarded (at 483) by the receiving module 135.

The receiving module 135 determines (at 484) if the received sequence number (e.g., seq 3000) is equal to the sequence number stored in the storage field (e.g., in the control block 220 of TCP) to determine if the received sequence number was used earlier to complete a reassembly event. In the context of the illustrated example of Table 1, the sequence number 3000 was previously stored (at 480). If it is determined (at 484) that the sequence number of the received data packet is equal to that stored in the storage field, then that is an indication that the received data packet is a duplicate copy of a previously received data packet and that the previously received data packet was employed earlier to complete an reassembly event. In the illustrated embodiment, the detection of an assembly event, along with a receipt of a duplicate copy of a data packet that was employed to complete the assembly event, suggests that packet reordering is occurring in the network 125. This is because when packet reordering occurs in the network 125 there is no actual loss of data packets; rather the data packets arrive out of sequence. Even though there may not be an actual loss of data packets, TCP requires the transmitter (e.g., the transmitting module 130) to retransmit a copy of the missing data packet in response to receiving a DUPACK from the device 110.

Thus, in the event packet reordering occurs, when the missing (but the original) out-of-order data packet is ultimately received by device 110, the receiving module 135 performs a reassembly event to place the received out-of-order data packets in a correct sequence and provides the corrected sequence to the appropriate application. In the meantime, the receiving module 135 may also receive a retransmitted, duplicate copy of the out-of-order packet that initially triggered the reassembly event. Thus, by detecting a duplicate copy of a data packet that previously triggered the reassembly event, the receiving module 135 is able to determine that packet reordering is occurring. Accordingly, once it is determined that packet reordering is occurring (i.e., that the sequence number of the received data packet is equal to the stored sequence number at block 484), the receiving module 135 sets the variable "packet reordering" to YES, thereby indicating that packet reordering has been detected and that "packet reordering" is now the current mode of operation.

If the receiving module determines (at 484) that the received sequence number is different from the stored sequence number, then that is an indication that the received data packet was not used in a reassembly event, in which case the receiving module 145 can receive (at 410) a next data packet. But, as noted, because the received sequence number (e.g., seq 3000) in the illustrated example is equal to the stored sequence number, the receiving module 135 sets the variable "packet reordering" to YES, and then receives (at 410) the next data packet, which, according to Table 1, is packet 5000 (e.g., packet 8), even though the next data packet that the receiving module 135 expects to receive is packet 4500.

The receiving module 135 determines (at 415) if the sequence number of the received data packet (e.g., packet 5000) is equal to the next-expected sequence number (e.g., seq 4500). Next, the receiving module 135 determines (at 435) if the sequence number of the received data packet (e.g., packet 5000) is greater than the next-expected sequence number (e.g., seq 4500). If it is determined (at 435) that the received sequence number is greater than the next-expected sequence number, as is the case in the illustrated example, the receiving module 135 determines (at 437) if the variable "packet reordering" is set to YES (i.e., an indication that packet reordering has been detected, and that the current mode of operation should be the "packet reordering" mode). In the instant case, because packet reordering was detected earlier, the "packet reordering" variable was initialized to YES (at 486). As noted earlier, in the "packet reordering" mode, the receiving module 135, based on detecting an out of sequence data packet, delays the transmission of a DUPACK by a preselected time interval. Accordingly, in FIGS. 4A-4B, the receiving module 135 sets (at 490) a timer to expire after a preselected timer interval. In one embodiment, the act of setting a timer (at 490) may include making a call to an operating system function with the appropriate parameters, such as the amount of delay time desired and a name of a procedure to invoke after the delay time has expired. If the expected data packet (e.g., packet 4500) does not arrive within the preselected time interval, upon expiration of the timer, the operating system may invoke the specified procedure that allows the receiving module 135, in one embodiment, to transmit a DUPACK to the sending device 105.

Upon setting the timer (at 490), the receiving module 135 stores (at 460) the received data packet (e.g., packet 5000) in the reassembly queue 225. The receiving module 135 receives (at 470) a next data packet (e.g., packet 5500 in Table 1). The sequence number of this received data packet is compared (at 475) to the next-expected sequence number, which, as noted in Table 1, remains at 4500 because that packet has not yet been received. The above-described acts are repeated for packet 5500, and it too is stored in the reassembly queue 225. The next data packet received (at 470) by the receiving module 135, according to Table 1, is packet 4500, which also is the next-expected data packet.

Thus, the receiving module 135, upon determining (at 475) that the received data packet is the next expected data packet, resets (at 477) the timer that was previously set at block 490, if the variable "packet reordering" is set to YES. In the instant case, as discussed above, the variable "packet reordering" was previously set to YES. Accordingly, the timer is reset.

In the illustrated flow diagram of FIGS. 4A-4B, whether the receiving module 135 transmits a DUPACK for the received out-of-order packets 5000 and 5500 depends on whether packet 4500 is received within the preselected time interval. Thus, if packet 4500 does not arrive within the desired time, then the corresponding DUPACKs may be transmitted. The transmission of these DUPACKs thus occurs in a manner similar to that occurring in conventional TCP systems. However, if packet 4500 arrives within the desired time, then the need to transmit DUPACKs is reduced or obviated, which may improve network performance not only because no acknowledgements are sent but also because the congesting window of the transmitting module 130 may not need to reduced.

In one embodiment, the preselected time interval delay may be based on a timer conventionally employed in TCP receivers for transmitting acknowledgments to TCP transmitters. This timer typically provides a delay of up to 200 milliseconds. Alternatively, a separate timer may be used to provide the desired amount of delay, such as up to 50 milliseconds. In alternative embodiments, any other desirable delay interval may be employed based on the implementation objective.

The receiving module 135 stores (at 480) the sequence number of the received data packet (e.g., seq 4500) in the storage field (e.g., in the control block 220 of TCP) and also stores (at 480) the received data packet (e.g., data packet 4500) in the reassembly queue 225. The receiving module 135 processes (at 482) the data packets stored in the reassembly queue 225. The act of processing (at 482) may include organizing the packets sequentially, providing the sequentially organized packets to the appropriate application (e.g., HTTP, FTP, etc.) in the application layer 210(5) (see FIG. 2), and/or transmitting a cumulative acknowledgement to the sending device 105 upon receiving the missing data packet.

The above-described procedure may be repeated as additional data packets are received by the receiving module 135. It should be appreciated that various acts described in FIGS. 4A-4B need not be performed in a serial manner as shown but rather can be performed substantially in parallel.

For example, in one embodiment, while the receiving module 135 processes a received data packet (at 420), it may also receive (at 410) other data packets that are transmitted by the sending device 105. As an additional example, the receiving module 135 may perform a reassembly event (at 482) while it transmits acknowledgments to the sending device 105. Similarly, various other acts may be performed substantially concurrently in accordance with one embodiment of the present invention embodiment of the present invention. It is also noted that acts described in the flow diagram of FIGS. 4A-4B are illustrative in nature, and that, depending on the implementation, one or more of the described acts may be altered or omitted without deviating from the spirit and scope of the present invention.

Figure 5:
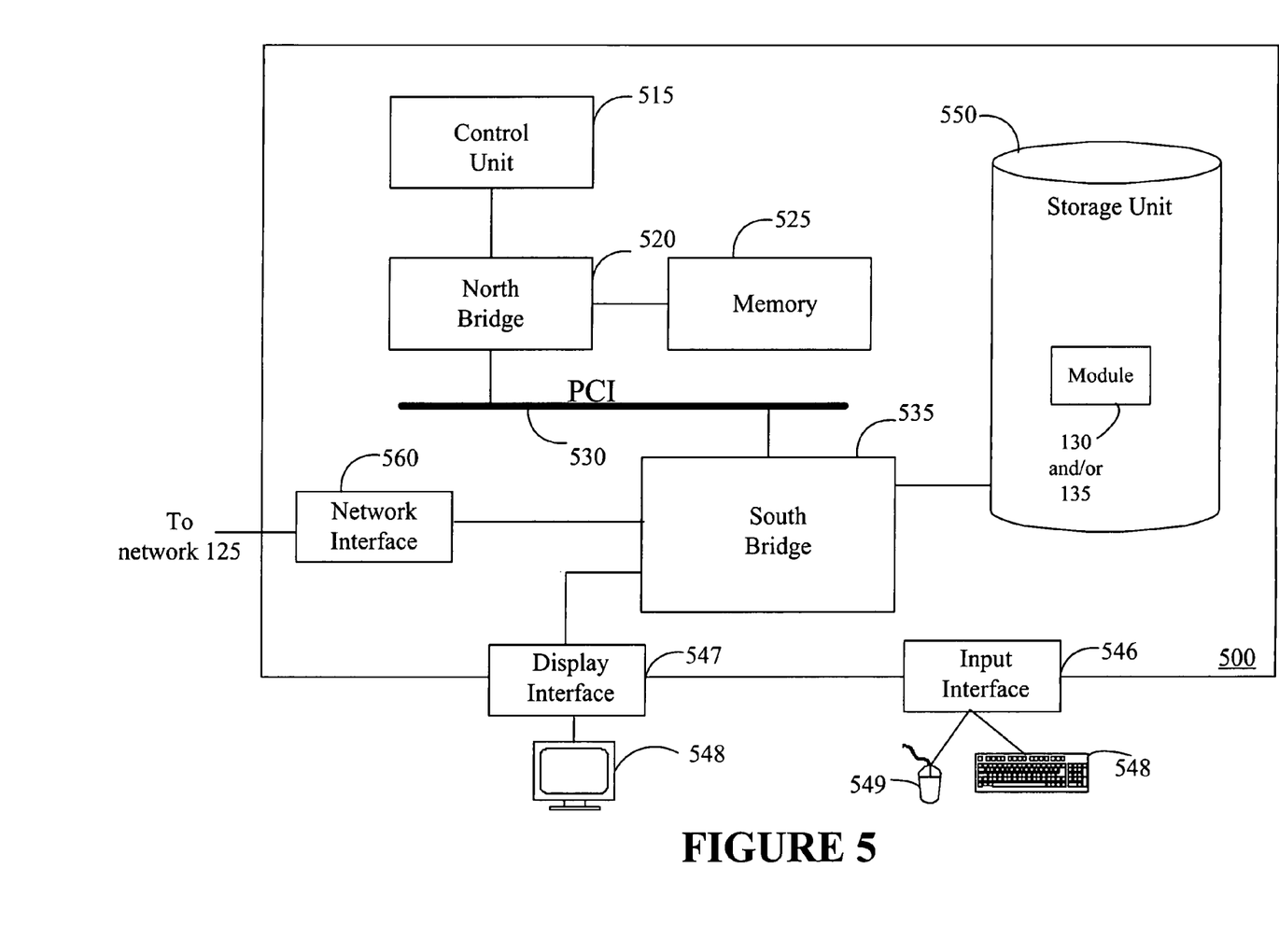
FIG. 5 depicts a block diagram of a processor-based system that may be implemented in the communications system of FIG. 1, in accordance with one embodiment of the present invention.

Referring now to FIG. 5, a stylized block diagram of a device 500 that may be implemented in the communications system 100 of FIG. 1 is illustrated, in accordance with one embodiment of the present invention. That is, the device 500 may represent one embodiment of the processor-based devices 105, 110. The device 500 comprises a control unit 515, which in one embodiment may be a processor that is capable of interfacing with a north bridge 520. The north bridge 520 provides memory management functions for a memory 525, as well as serves as a bridge to a peripheral component interconnect (PCI) bus 530. In the illustrated embodiment, the system 500 includes a south bridge 535 coupled to the PCI bus 530.

A storage unit 550 is coupled to the south bridge 535. In one embodiment, the transmitting module 130 and/or receiving module 135 may be stored in the storage unit 550. Although not shown, it should be appreciated that in one embodiment an operating system, such as Windows®, Disk Operating System®, Unix®, OS/2®, Linux®, MAC OS®, or the like, may be stored on the storage unit 550 and executable by the control unit 515. The storage unit 550 may also include device drivers for the various hardware components of the system 500.

In the illustrated embodiment, the system 500 includes a display interface 547 that is coupled to the south bridge 535. The system 500 may display information on a display device 548 via the display interface 547. The south bridge 535 of the system 500 may include a controller (not shown) to allow a user to input information using an input device, such as a keyboard 548 and/or a mouse 549, through an input interface 546.

The south bridge 535 of the system 500, in the illustrated embodiment, is coupled to a network interface 560, which may be adapted to receive, for example, a local area network card. In an alternative embodiment, the network interface 560 may be a Universal Serial Bus interface or an interface for wireless communications. The system 500 communicates with other devices through the network interface 560. In one embodiment, the network interface 560 may support communications using one or more of the protocols depicted in FIG. 2.

It should be appreciated that the configuration of the device 500 of FIG. 5 is exemplary in nature and that, in other embodiments the device 500 may include fewer, additional, or different components without deviating from the spirit and scope of the present invention. For example, in an alternative embodiment, the device 500 may not include a north bridge 520 or a south bridge 535, or may include only one of the two bridges 520, 535, or may combine the functionality of the two bridges 520, 535. As another example, in one embodiment, the system 500 may include more than one control unit 515. Similarly, other configurations may be employed consistent with the spirit and scope of the present invention.

The various system layers, routines, or modules may be executable control units (such as control unit 515 (see FIG. 5)). The control unit 515 may include a microprocessor, a microcontroller, a digital signal processor, a processor card (including one or more microprocessors or controllers), or other control or computing devices. The storage devices 550 referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices 550. The instructions when executed by a respective control unit 515 cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   receiving a data packet;
   determining if the data packet is a next expected data packet;
   determining if packet reordering occurred prior to receiving the data packet; and
   delaying transmission of an acknowledgement indicating that a data packet is missing in response to determining that the data packet is not the next expected data packet and in response to determining that the packet reordering occurred.

2. The method of claim 1, wherein delaying comprises:
   determining that the acknowledgement should be transmitted if the data packet is received out of order; and
   waiting a preselected amount of time in response to determining that the acknowledgment should be transmitted.

3. The method of claim 2, further comprising:
   determining if the missing data packet is received within the preselected amount of time; and
   transmitting the acknowledgment in response to determining that the missing data packet is not received within the preselected amount of time.

4. The method of claim 1, wherein the data packet has an associated sequence number, and wherein determining if the received data packet is the next expected data packet comprises:
   determining a sequence number of the next expected data packet; and
   determining if the sequence number of the received data packet is not equal to the sequence number of the next expected data packet.

5. The method of claim 1, wherein determining if the packet reordering occurred prior to receiving the data packet comprises:

detecting a missing data packet among one or more data packets that are received prior to receiving the data packet;

transmitting an acknowledgement indicating that the missing data packet has not been received;

receiving the missing data packet, wherein the missing data packet has an associated sequence number;

storing the received sequence number associated with the received data packet that was previously missing;

receiving one or more subsequent data packets having an associated sequence number; and comparing the stored sequence number to the sequence number associated with the one or more subsequently received data packets to determine if packet reordering occurred.

6. The method of claim 1, wherein receiving the data packet comprises receiving the data packet over a network using at least the Transmission Control Protocol (TCP), and wherein delaying the transmission comprises delaying the transmission of a duplicate ACK.

* * * * *